US008205533B2

(12) United States Patent
Tanaka

(10) Patent No.: US 8,205,533 B2
(45) Date of Patent: Jun. 26, 2012

(54) SAW BLADE PROTECTORS

(75) Inventor: Koji Tanaka, Anjo (JP)

(73) Assignee: Makita Corporation, Anjo-shi (JP)

(*) Notice: Subject to any disclaimer, the term of this patent is extended or adjusted under 35 U.S.C. 154(b) by 477 days.

(21) Appl. No.: 12/382,101

(22) Filed: Mar. 9, 2009

(65) Prior Publication Data

US 2009/0229437 A1 Sep. 17, 2009

(30) Foreign Application Priority Data

Mar. 11, 2008 (JP) ................................. 2008-060931
Aug. 8, 2008 (JP) ................................. 2008-205593

(51) Int. Cl.

*B23D 19/00* (2006.01)
*B27B 3/28* (2006.01)
*B26D 1/18* (2006.01)
*B26D 1/14* (2006.01)
*B27G 19/00* (2006.01)

(52) U.S. Cl. ...... 83/478; 83/102.1; 83/477.2; 144/251.1

(58) Field of Classification Search ................. 83/102.1, 83/478, 477.2, 544, 520, 581, 477; 144/251.1, 144/251.3, 286.5, 287, 253.3
See application file for complete search history.

(56) References Cited

U.S. PATENT DOCUMENTS

| | | | | |
|---|---|---|---|---|
| 1,879,280 | A * | 9/1932 | James | 83/477 |
| 2,007,887 | A * | 7/1935 | Tautz | 83/102.1 |
| 2,352,235 | A * | 6/1944 | Tautz | 83/102.1 |
| 2,425,331 | A * | 8/1947 | Kramer | 83/478 |
| 2,466,325 | A * | 4/1949 | Ocenasek | 83/102.1 |
| 2,593,596 | A * | 4/1952 | Olson | 83/102.1 |
| 2,659,400 | A * | 11/1953 | Petersen | 83/478 |
| 2,695,638 | A * | 11/1954 | Gaskell | 83/477 |
| 3,105,530 | A * | 10/1963 | Peterson | 83/478 |
| 3,232,326 | A * | 2/1966 | Speer et al. | 83/102.1 |
| 3,249,134 | A * | 5/1966 | Vogl et al. | 83/478 |
| 6,405,624 | B2 | 6/2002 | Sutton | |
| 6,578,460 | B2 * | 6/2003 | Sartori | 83/100 |
| 7,210,386 | B1 * | 5/2007 | Chang | 83/477.2 |
| 7,302,878 | B2 * | 12/2007 | Chang | 83/102.1 |
| 7,434,501 | B2 * | 10/2008 | Chuang | 83/478 |
| 2004/0255745 | A1 * | 12/2004 | Peot et al. | 83/102.1 |
| 2005/0211034 | A1 | 9/2005 | Sasaki et al. | |
| 2005/0235793 | A1 * | 10/2005 | O'Banion et al. | 83/478 |
| 2006/0042441 | A1 | 3/2006 | Ichikawa et al. | |
| 2007/0056416 | A1 | 3/2007 | Shibata | |
| 2007/0113715 | A1 * | 5/2007 | Burke et al. | 83/102.1 |
| 2007/0186739 | A1 * | 8/2007 | Peot et al. | 83/102.1 |
| 2008/0022827 | A1 * | 1/2008 | Weir et al. | 83/478 |

FOREIGN PATENT DOCUMENTS

| | | | |
|---|---|---|---|
| EP | 1 491 304 | A2 | 12/2004 |

* cited by examiner

*Primary Examiner* — Ghassem Alie
*Assistant Examiner* — Bharat C Patel
(74) *Attorney, Agent, or Firm* — Oliff & Berridge, PLC

(57) ABSTRACT

A saw blade protector for a cutting device having a table for placing thereon a workpiece, a saw blade protruding from an upper surface of the table, and a riving knife disposed in front of the saw blade in a moving direction of the workpiece for cutting the workpiece and positioned in line with the saw blade. The saw blade protector includes a guard plate constructed to cover the saw blade, a holding frame constructed to be mounted on an upper portion of the riving knife and to be able to support the guard plate, and an adjusting device constructed to be able to adjust a position of the holding frame relative to the upper surface of the table.

5 Claims, 11 Drawing Sheets

SAW BLADE PROTECTORS

This application claims priority to Japanese patent application serial numbers 2008-60931 and 2008-205593, the contents of which are incorporated herein by reference.

BACKGROUND OF THE INVENTION

The present invention relates to protectors covering saw blades of cutting devices called as "table saws", in which an upper portion of a saw blade protrudes from an upper surface of a table, on which a workpiece is put.

According to a known table saw, an upper portion of a circular saw blade protrudes from an upper surface of a table, on which a workpiece is put, and cuts the workpiece when the workpiece is moved toward the saw blade along the table. In such a known table saw, a saw blade protector is generally provided in order to prevent other substance than the workpiece from contacting with the saw blade protruding upwardly from the table. The saw blade protector has guard plates covering mainly both right and left sides and upper side of the saw blade, and a mechanism configured to move the guard plates upwardly due to interaction with the workpiece moved toward the saw blade. In general, the guard plates are supported by a holding frame attached to an upper portion of a riving knife such that the guard plates can pivot upwardly and downwardly. It is preferred that the saw blade protector not only can merely pivot upwardly and downwardly, but also be completely removed together with the holding frame for, e.g., easy exchange of the saw blade.

With respect to the table saw, the saw blade rotates in such a direction that a rear side with respect to a cutting direction (i.e., the side of the operator) of the saw blade moves downwardly whereas a front side of the saw blade moves upwardly. Therefore, when the rear side of the saw blade rotating at high speed contacts with cut surfaces of the workpiece right after cutting, the workpiece may be forced to move upwardly (so-called "kickback phenomenon"). In such case, it is difficult to carry out cut process smoothly. Therefore, in a known table saw, a riving knife having the substantially same thickness as the saw blade is provided in front of the saw blade with respect to the cutting direction such that the saw blade and the riving knife are aligned in line. The width between opposite cut surfaces of the workpiece can be held at a predetermined distance by the riving knife positioned between the opposite cut surfaces in order to prevent the cut surfaces from contacting with the saw blade. In addition, kickback prevention claws for preventing the upward movement of the workpiece are disposed on opposite sides of the riving knife such that the kickback prevention claws does not inhibit the movement of the workpiece in the cutting direction during the cutting operation. Similar to the cover structure, the kickback prevention claws are supported by the holding frame.

US2007/0056416A1 (Japanese Laid Open Patent Publications No. 2007-76235) and US2005/0211034A1 (Japanese Laid-Open Patent Publications No. 2005-254671) disclose some techniques with respect to saw blade protectors, riving knives and kickback prevention claws.

The saw blade protectors disclosed in the above patent publications include neither a mechanism for adjusting the height of the holding frame fixed on the upper portion of the riving knife relative to the upper surface of the table nor a mechanism for adjusting inclination of the holding frame in forward and rearward directions with respect to a cutting direction or a direction parallel to the moving direction of a workpiece. Therefore, the inclination of the holding frame with respect to the cutting direction cannot be adjusted depending on, e.g., processing accuracy and assembly accuracy of the related components, and thus, for example, it is not able to accurately control a vertical distance between a rear end of the holding frame (an end close to the operator) with respect to the cutting direction and the upper surface of the table in order to set a covering range of the guard plate for the saw blade.

Therefore, there has been a need for improved saw blade protectors capable of adjusting the position of a holding frame for supporting a guard plate(s) covering a saw blade in order to adjust the relative position of the guard plate(s) to the saw blade.

BRIEF SUMMARY OF THE INVENTION

According to a first aspect of the present invention, a saw blade protector for a cutting device having a table for placing thereon a workpiece, a saw blade protruding from an upper surface of the table, and a riving knife disposed in front of the saw blade in a moving direction of the workpiece for cutting the workpiece and positioned in line with the saw blade. The saw blade protector include a guard plate constructed to cover the saw blade, a holding frame constructed to be mounted on an upper portion of the riving knife and to be able to support the guard plate and an adjusting device constructed to be able to adjust a position of the holding frame relative to the upper surface of the table. Accordingly, it is able to alter the relative position of the guard plate to the saw blade by adjusting the position of the holding frame in the vertical direction.

DETAILED DESCRIPTION OF THE INVENTION

Each of the additional features and teachings disclosed above and below may be utilized separately or in conjunction with other fires and teachings to provide improved saw blade protectors. Representative examples of the present invention, which examples utilized many of these additional features and teachings both separately and in conjunction with one another, will now be described in detail with reference to the attached drawings. This detailed description is merely intended to teach a person of skilled in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadcast sense, and are instead taught merely to particularly describe representative examples of the invention. Moreover, various features of the representative examples and the dependent claims may be combined in ways that are not specifically enumerated in order to provide additional useful embodiments of the present teachings.

Figure 1:
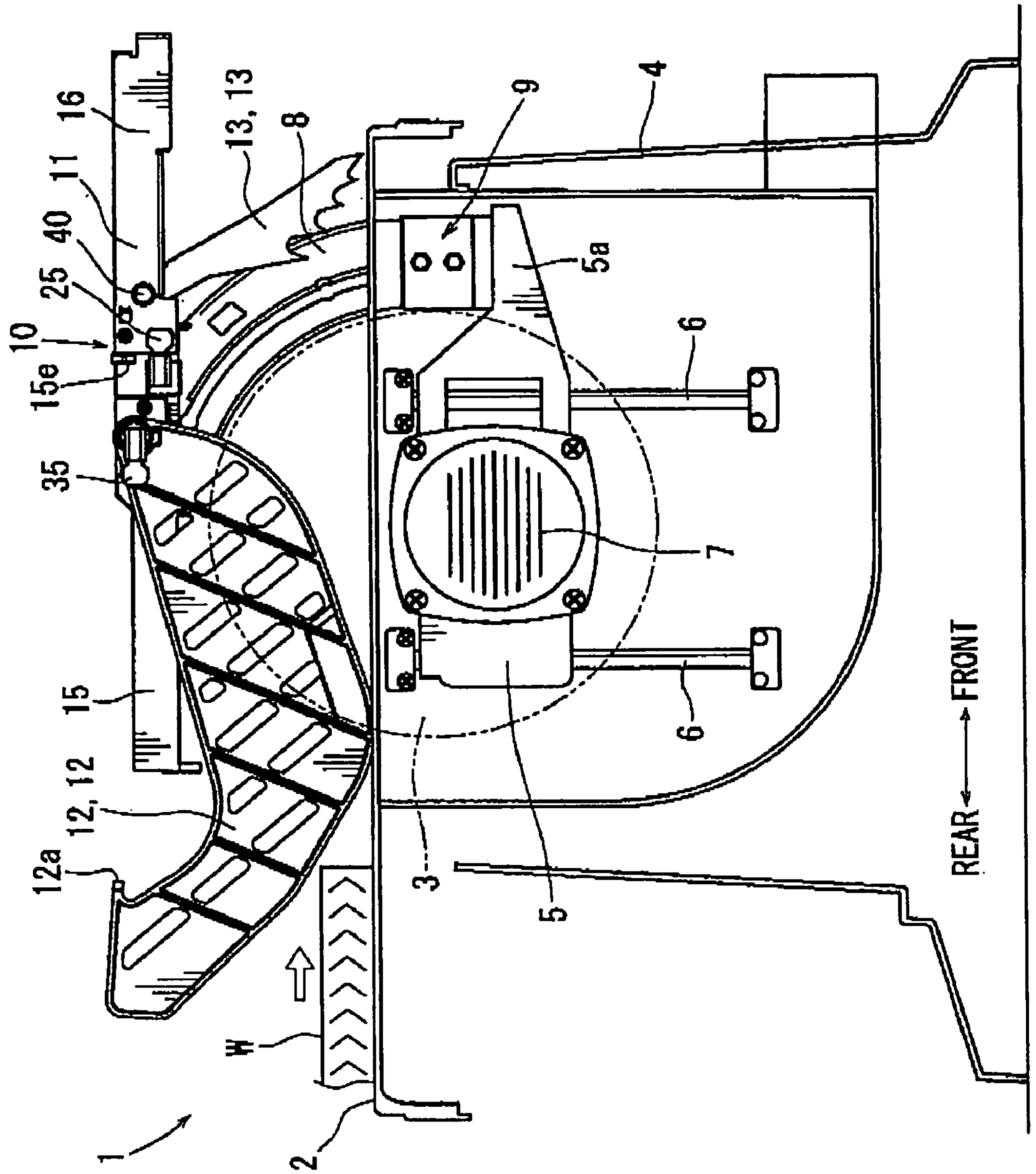
FIG. 1 is a right side view of a cutting device having a saw blade protector according to an embodiment of the present invention.

An embodiment will be described in reference to FIGS. 1-7. FIG. 1 shows a whole structure of a cutting device 1 incorporating a saw blade protector 10 according to this embodiment. In the embodiment, a table saw is exemplified as the cutting device 1. This embodiment is characterized by the construction of the saw blade protector 10 covering a saw blade 3 protruding from an upper surface of a table 2, and therefore, the structure of the cutting device 1 other than the saw blade protector 10 will be described in brief.

The cutting device 1 includes the table 2 where a workpiece W is put on. A mount base 4 supports the table 2, so that the upper surface of the table 2 extends substantially horizontally. The saw blade 3 has a circular configuration. An upper portion of the circular saw blade 3 protrudes upwardly from a substantially center portion of the table 2. The saw blade 3 is supported by a lift base 5 disposed below the table 2, and can be rotated by a driving motor 7. Slide shafts 6 extending in the vertical direction and mounted on the mount base 4 support the lift base 5 such that the lift base 5 can move parallel in the vertical direction to an upper movable end show in FIG. 1. Therefore, the protruding distance of an upper portion of the saw blade 3 from the upper surface of the table 2 (i.e., a depth of cut into the workpiece W) can be altered.

In order to perform a cutting operation, an operator may be positioned on the left side of the table 2 as viewed in FIG. 1. The operator then moves the workpiece W toward the saw blade 3 in a cutting direction indicated by an outline arrow in FIG. 1 (moving direction of the workpiece W) in order to cut the workpiece W. Hereinafter, the terms of front and rear directions and right and left directions are used to mean directions as viewed from the side of the operator. Therefore, as indicated by the outline arrow in FIG. 1, the saw blade 3 cuts the workpiece W as the workpiece W moves forward in the cutting direction. The side close to the operator corresponds to a rear side with t to the cutting direction.

A riving knife 8 is disposed in front of the saw blade 3 in the cutting direction (on the right side as viewed in FIG. 1). The riving knife 8 is a flat plate having substantially the same thickness as the saw blade 3 and is positioned in line with the saw blade 3. The riving knife 8 is attached to a mount portion 5*a*, which is provided on the lift base 5, via an attachment base 9, and its upper portion protrudes upwardly from the upper surface of the table 2. The riving knife 8 has a first flat surface and a second flat surface on a circumference thereof (see, for example, bearing portions 8*b*, and 8*c* illustrated in FIG. 6). The attachment base 9 has a mechanism for optionally and easily adjusting a protruding distance of the riving knife 8 from the upper surface of the table 2. The riving knife 8 can be inserted between opposite cut surfaces of the workpiece W right after a cut in order to keep a distance between the opposite cut surfaces constantly, thereby preventing the opposite cut surfaces from contacting with the saw blade 3 in order to avoid kickback of the workpiece W.

Figure 2:
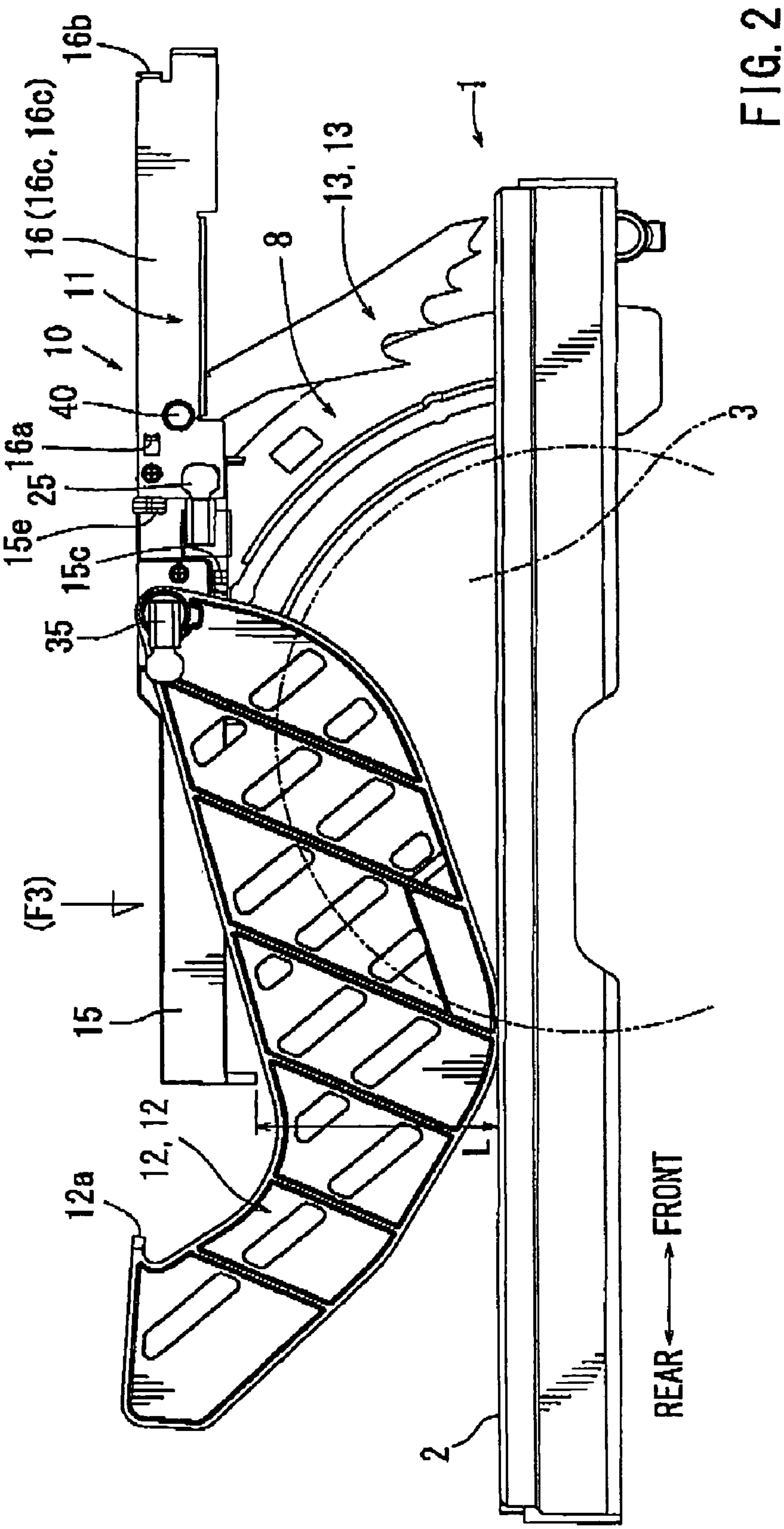
FIG. 2 is a right side view of the saw blade protector according to the present invention.

A saw blade protector 10 according to this embodiment is provided at the upper end of the riving knife 8 protruding upwardly from the table 2. A detailed configuration of the saw blade protector 10 is shown in FIG. 2 and its subsequent figures. The saw blade protector 10 has a holding frame 11 elongated in forward and rearward directions, a pair of guard plates 12, and a pair of kickback prevention claws 13.

Figure 6:
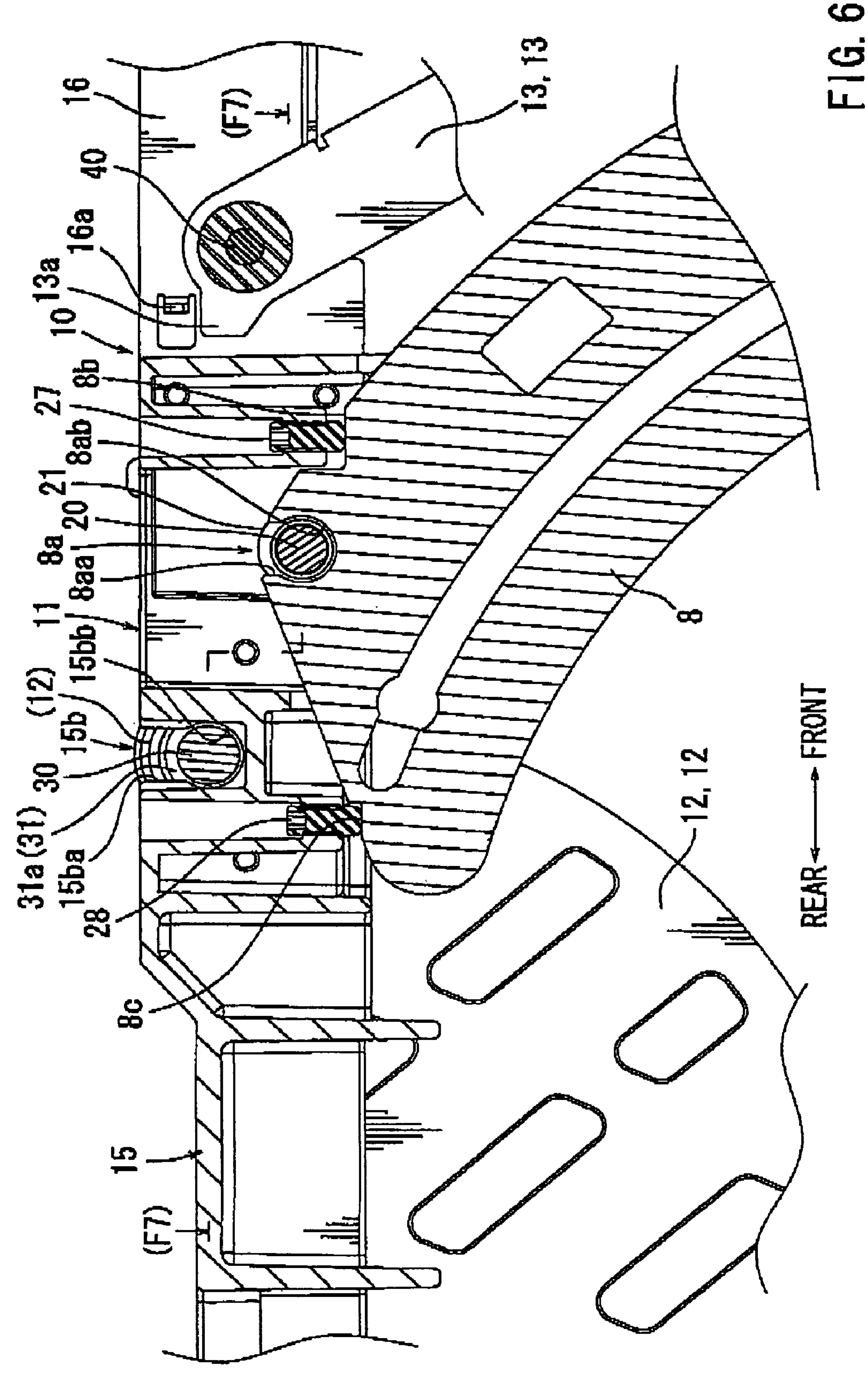
FIG. 6 is a partially enlarged vertical cross sectional view of FIG. 4, showing an attachment configuration of the saw blade protector to the riving knife.
Figure 7:
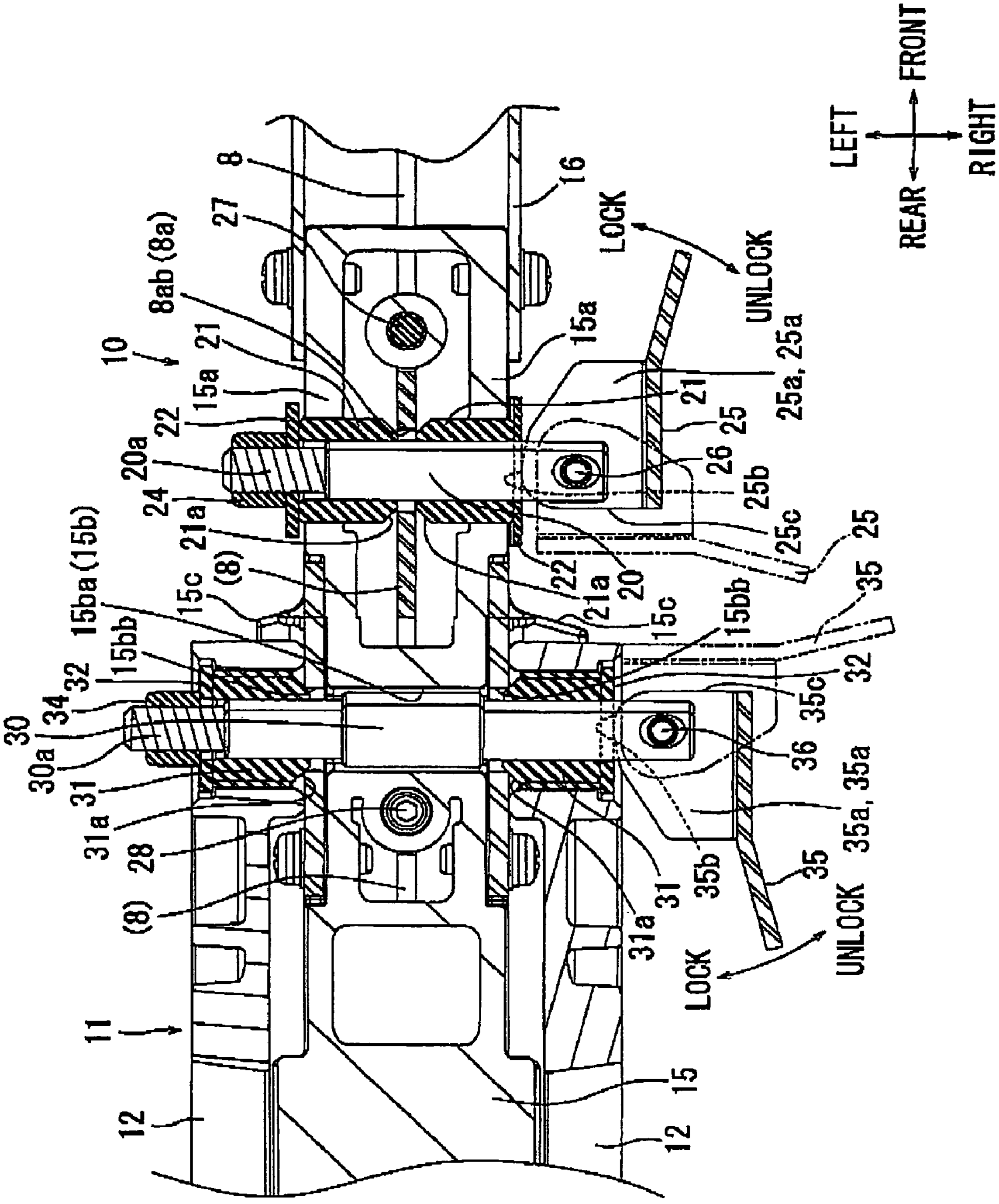
FIG. 7 is a vertical cross sectional view taken along a line (F7)-(F7) in FIG. 6.

The holding frame 11 includes a frame body portion 15 disposed on the side close to the operator, and an auxiliary frame portion 16 extending forwardly from a front end of the frame body portion 15. The frame body portion 15 extends rearwardly from the upper portion of the riving knife 8, and the auxiliary frame portion 16 extends forwardly from the upper portion of the riving knife 8. A substantially central portion with respect to the longitudinal direction of the holding frame 11 or a portion of the holding frame 11 proximal to a connecting region between the fame body portion 15 and the auxiliary frame portion 16 is supported by the riving knife 8. A detailed structure for supporting the holding frame 11 on the riving knife 8 is shown in FIGS. 6 and 7.

A frame shaft 20 is supported near a front end of the frame body portion 15. The fame shaft 20 is supported between supporting walls 15*a*, which are provided at a front section of the frame body portion 15 and are spaced away form each other in a transverse direction (right and left directions). A pair of lock sleeves 21 is attached to the frame shaft 20. The lock sleeves 21 are attached to an outer circumference of the frame shaft 20 such that the lock sleeves 21 are movable in an axial direction and rotatable about the frame shaft 20 independently of each other, but cannot move in a radial direction. Tapered surfaces 21*a* are formed on inner ends of the lock sleeves 21 facing each other.

Outer ends of the lock sleeves 21 (opposite ends to the tapered surfaces 21*a*) bear against left and right flanges 22, respectively. A threaded shaft portion 20*a* is formed on one end of the frame shaft 20 and protrudes outward from the left flange 22. A fixing nut 24 is engaged with and tightened on the threaded shaft portion 20*a*. Whereas, the other end of the frame shaft 20 protrudes outward from the right flange 22. A frame lever 25 is attached to this protruding portion of the frame shaft 20. The frame lever 25 has a pair of parallel plates 25*a* to position the protruding portion of the frame shaft 20 therebetween. The frame lever 25 is pivotally supported by the protruding portion via a shaft 26 extending between the parallel plates 25*a*. A cam portion 25*b* is formed at one end of each plate 25*a* and has a cam edge that is spaced from the shaft 26 by a distance larger than a distance between a side edge 25*c* of each plate 25*a* and the shaft 26. FIG. 7 shows a lock position of the frame lever 25, where the cam portions 25*b* bear against the right flange 22, respectively. In this state, the distance between the both flanges 22 become shorter, and the lock sleeves 21 become close to each other. Accordingly, since the riving knife 8 is firmly held between the tapered surfaces 21*a* as described below, the holding frame 11 and thus the saw blade protector 10 is fixed onto the riving knife 8.

Figure 8:
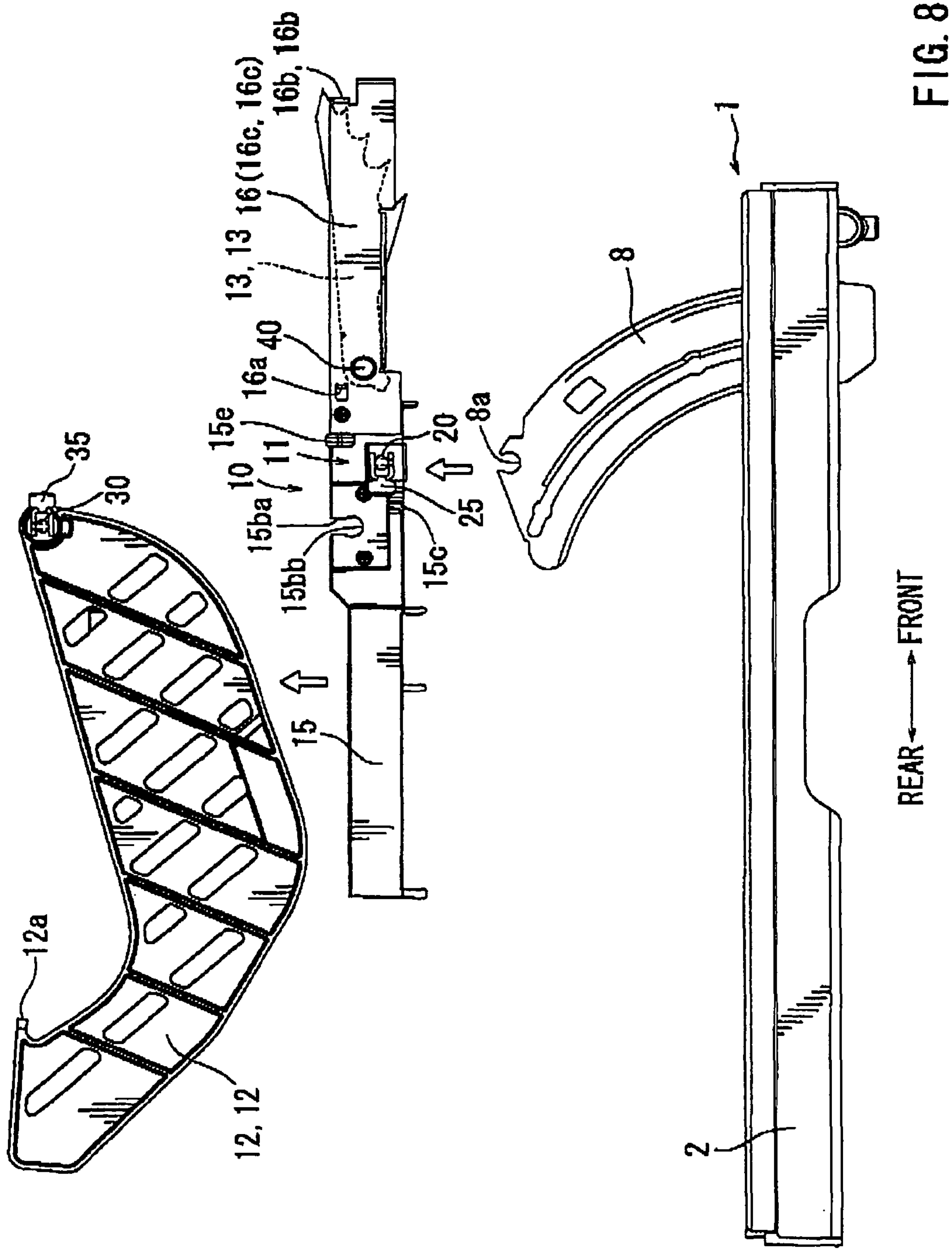
FIG. 8 is a right side view of the saw blade protector according to the present invention, where the saw blade protector is detached from the riving knife, and both guard plates are detached from the holding fee.
Figure 9:
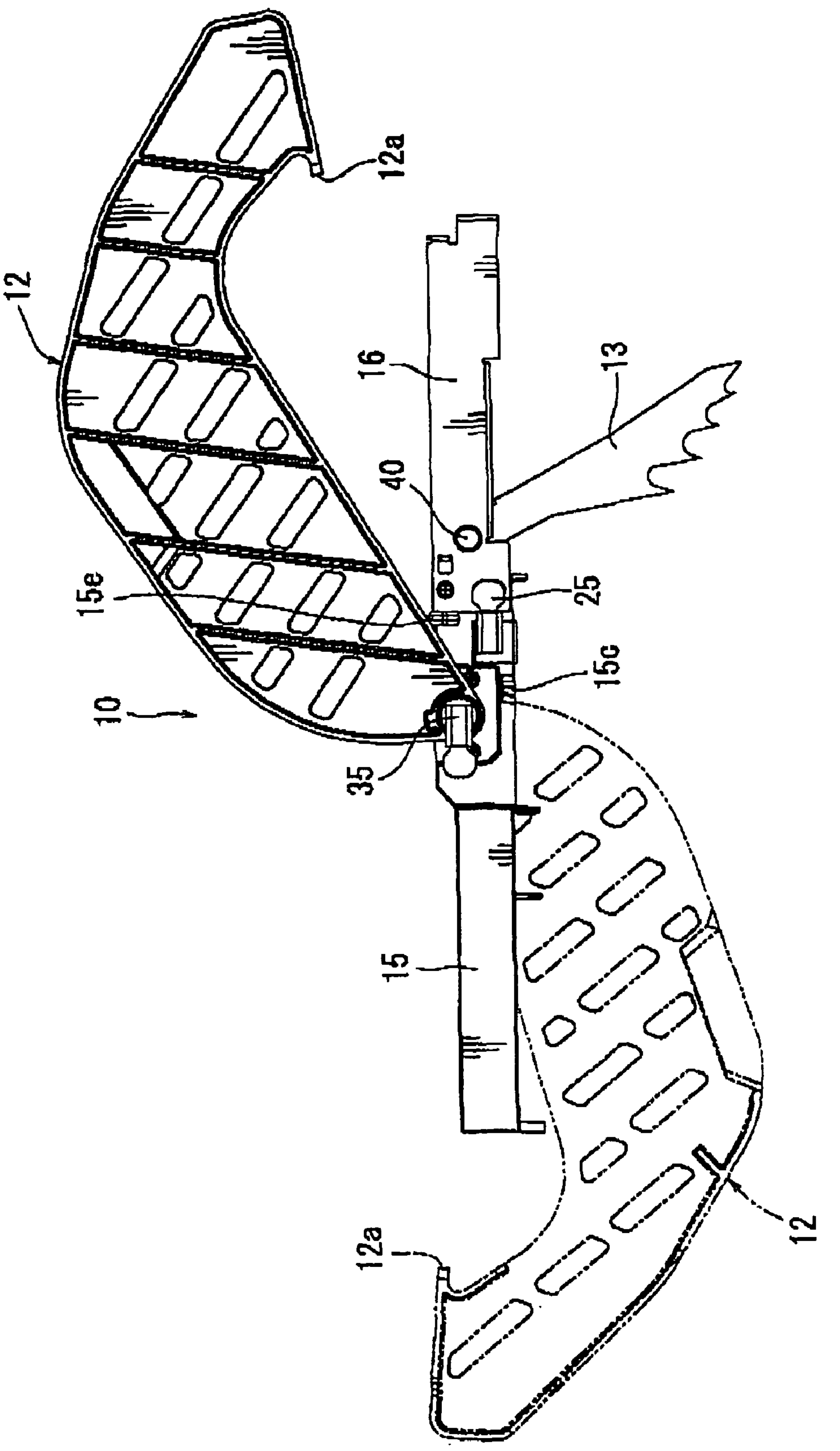
FIG. 9 is a right side view of the whole of the saw blade protector according to the present invention, where the guard plate in an evacuation position is depicted by solid line, whereas the guard plate in guard position is depicted by chain double-dashed line, and the saw blade protector is removed from the riving knife.
Figure 10:
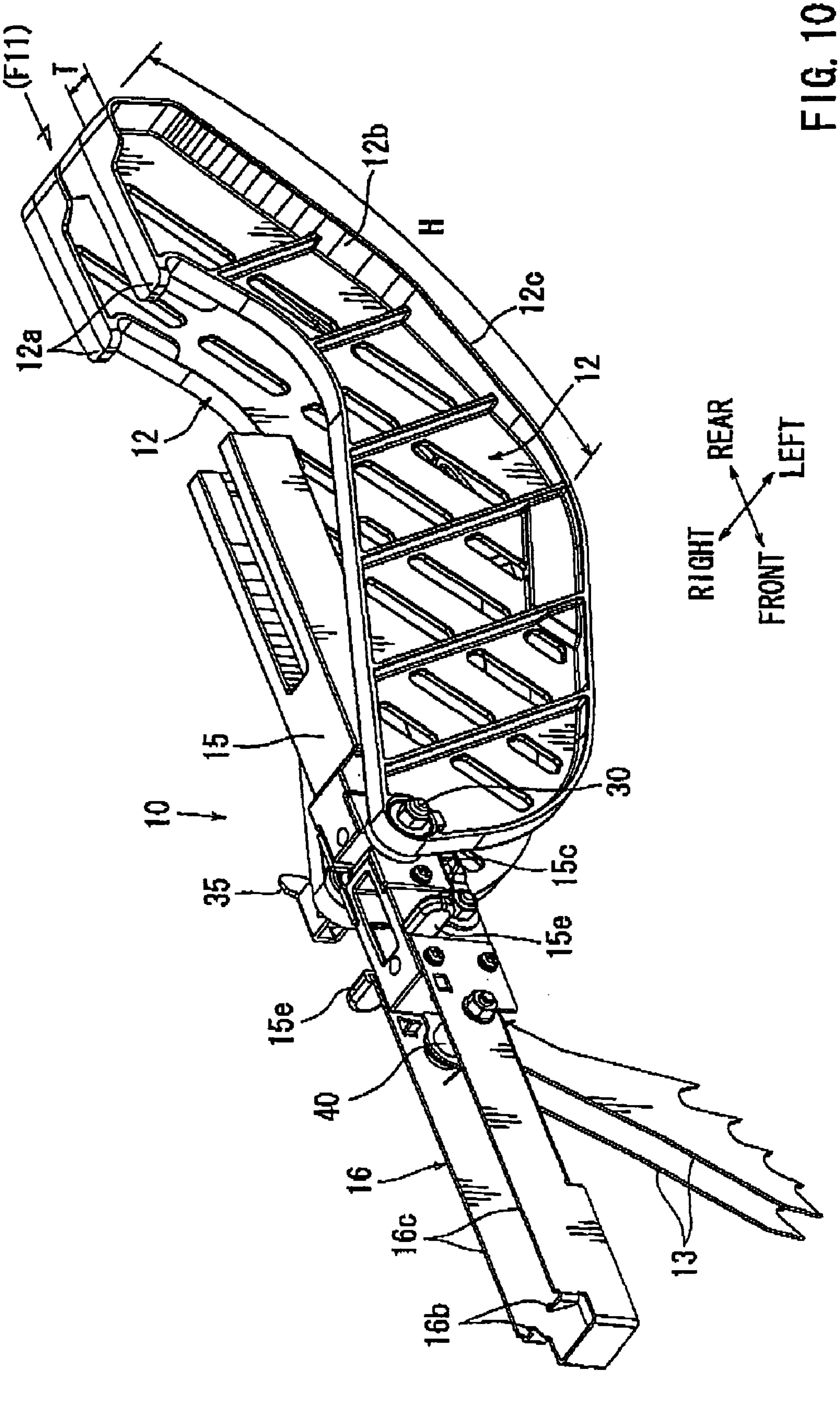
FIG. 10 is a perspective view of the saw blade protector according to the present invention.

As the frame lever 25 moves from the lock position to an unlock position depicted by chain double-dashed line by rotating the frame lever 25 about the shaft 26 by an angle of 90-degrees in a clockwise direction (see a two-headed arrow on the right side in FIG. 7), the cam edges of the cam portions 25*b* move not to face the right flange 22, while the side edges 25*c* move to face to the flange 22. In this unlock condition, since the distance between the lock sleeves 21 becomes larger, fixation of the riving knife 8 may be released. Therefore, the frame shaft 20 can be moved upwardly in the radial direction and can be removed through a frame mounting opening 8*a* described below, so that the holding frame 11, and thus, the saw blade protector 10 can be removed from the riving knife 8. FIGS. 8-10 show a state where the saw blade protector 10 has been detached from the riving knife 8.

As shown in FIG. 6, the frame mounting opening 8*a* is formed in an upper end portion of the riving knife 8. The frame mounting opening 8*a* has a keyhole shape opening upward and includes a narrowed portion 8*aa* and a circular-shape fixing portion 8*ab* continuously formed with the bottom of the narrowed portion 8*aa*. A width of the narrowed portion 8*aa* is smaller than a diameter of the fixing portion 8*ab* as shown in FIG. 6. In addition, the width of the narrowed portion 8*aa* is larger than a diameter of the frame shaft 20, and the diameter of the fixing portion 8*ab* is smaller than an outer diameter of each lock sleeve 21.

Accordingly, as the frame lever 25 moves to the lock position depicted by solid line in FIG. 7, the distance between the lock sleeves 21 becomes shorter due to the action of the cam portions 25*b*, so that the tapered surfaces 21*a* are pressed against a circumferential edge of the fixing portion 8*ab*, thereby firmly holding the riving knife 8 between the lock sleeves 21.

On the other hand, as the frame lever 25 moves to the unlock position depicted by chain double-dashed line in FIG. 7, the pressing condition of the tapered surfaces 21*a* against the circumferential edge of the fixing portion 8*ab* is released. In this state, the saw blade protector 10 can be removed from the riving knife 8 by lifting the saw blade protector 10 upwardly and removing the frame shaft 20 from the frame opening 8*a* through the narrowed portion 8*aa* as shown in FIG. 8.

As shown in FIG. 6, a pair of position adjusting screws 27 and 28 are threadably engaged with the frame body portion 15 so as to be attached thereto. These position adjusting screws 27 and 28 are positioned on the front side and the rear side of the frame shaft 20, respectively. The position adjusting screws 27 and 28 can contact with bearing portions 8*b* and 8*c* formed on the upper end of the riving knife 8, respectively. The distances between the lower ends of the position adjusting screws 27 and 28 and the lower surface of the frame body portion 15 can be adjusted by rotating the position adjusting screws 27 and 28 for changing the protruding distances of the lower ends of the position adjusting screws 27 and 28.

Accordingly, if the protruding distance of the position adjusting screw 27 positioned on the front side is larger than protruding distance of the position adjusting screw 28 positioned on the rear side, the holding frame 11 may be tilted about the frame shaft 20 in the counterclockwise direction in FIG. 6, and thus, the holding frame 11 can be tilted such that the rear end (the end close to the operator) of the holding frame 11 moves downwardly.

On the other hand, if the protruding distance of the position adjusting screw 27 positioned on the front side is smaller than the protruding distance of the position adjusting screw 28 positioned on the rear side, the holding frame 11 may be tilted about the frame shaft 20 in the clockwise direction in FIG. 6 such that the rear end of the holding frame 11 moves upwardly. In this way, with respect to the holding frame 11, the inclination toward the right or left direction and the distance from the upper surface of the table 2 can be finely adjusted by controlling the protruding distances of the position adjusting screws 27 and 28.

The pair of the right and left guard plates 12 is supported near the center portion with respect to the longitudinal direction of the holding frame 11 (on the frame body portion 15 in this embodiment). More specifically, the guard plates 12 are vertically pivotally supported by the frame body portion 15 via a guard shaft 30. These guard plates 12 cover right and left sides of the saw blade 3 in order to prevent dust generated by the cutting process from scattering.

The guard plates 12 can pivot independently on each other. Downward pivotal movements (in the counterclockwise direction in FIG. 2) of the guard plates 15 can be restricted by lower guard stoppers 15*c* mounted on opposite side portions of the frame body portion 15, respectively. The lower guard stoppers 15*c* protrude laterally from the side portions at positions substantially directly below the guard shaft 30. When the lower guard stoppers 15*c* contact with front sections of guard plates 12, downward pivotal movements of guard plates 12 can be stopped.

In addition, upward pivotal movements (in the clockwise direction in FIGS. 2 and 9) of the guard plates 12 can be restricted by upper guard stoppers 15*e* mounted on opposite side portions of the frame body portion 15. As shown in FIG. 9, when the guard plate 12 pivots upwardly by an angle of about 180 degrees from a guard position depicted by chain double-dashed line to a rest position depicted by solid line, the guard plate 12 contacts with the corresponding upper guard stopper 15*e* from above, so that firer pivotal movement of the guard plate 12 can be inhibited. In this way, when the guard plates 12 are supported by their corresponding upper guard stoppers 15*e* from below, the guard stoppers 12 can be held at the rest positions depicted by solid line in FIG. 9. In addition, by holding the guard plates 12 at the rest positions by the upper guard stoppers 15*e* while the holding frame 11 is detached, it is able to prevent unintended movement of the guard plates 12 during carrying the holding frame 11, and thus it is able to easily carry the holding frame 11. The upper guard stoppers 15*e* are covered with elastic covers in order to prevent the guard plates 12 from being damaged or deformed due to contact with the guard stoppers 15*e*. In FIG. 9, the guard plates 12 held by the lower guard stoppers 15*c* at the guard position are depicted by chain double-dashed line.

As shown in FIG. 8, hook portions 12*a* for engaging with fingers of the operator are formed on upper ends on the side away from the guard shaft 30 of the guard plates 12 in order to facilitate the pivoting operation of the guard plates 12. The hook portions 12*a* are formed integrally with the corresponding guard plates 12 such that the hook portions 12*a* protrude toward the pivotal axis of the guard plates 12 (i.e., the axis of the guard shaft 30).

In the state that the protector 10 is attached to the riving knife 8 as shown in FIGS. 1 and 2, or that the protector 10 is detached from the riving knife 8 as shown in FIGS. 9 and 10, the operator can engage his or her fingers with either one of the hook portions 12*a* of the guard plates 12 in order to pivot the guard plates 12 independently of each other.

The guard shaft 30 extends parallel to the frame shaft 20 and is positioned on the rear side of the frame shaft 20. The guard shaft 30 also has a pair of lock sleeves 31. The lock sleeves 31 are attached to an outer circumference of the guard shaft 30 such that the lock sleeves 31 can move in axial direction and can rotate about tie guard shaft 30 dependently of each other but cannot move in a radial direction. The guard plates 12 are rotatably mounted on opposite ends of the guard shaft 30 via the lock sleeves 31, respectively.

The lock sleeves 31 have tapered surfaces 31*a* at inner ends facing each other.

Outer ends (opposite ends to the tapered surfaces 31*a*) of the lock sleeves 31 contact with right and left flanges 32, respectively. A threaded shaft portion 30*a* formed on one end of the guard shaft 30 protrudes beyond the left flange 32 as shown in FIG. 7. A fixing nut 34 is threadably engaged with the threaded shaft portion 30*a*. Whereas, the other end of the guard shaft 30 protrudes beyond the right flange 32. A guard lever 35 is attached to the other end of the guard shaft 30. The guard lever 35 has a pair of parallel plates 35*a*. The protruding portion of the guard shaft 30 enters between the parallel plates 35*a*. The guard lever 35 is rotatably supported by this protruding portion via a shaft 36 wending between the parallel plates 35*a*. A cam portion 35*a* is formed at one end of each plate 45*a* and has a cam edge that is spaced from the shaft 26 by a distance larger than a distance between a side edge portion 35*c* of each plate 45*a* and the shaft 26. FIG. 7 shows a lock position of the guard lever 35, where cam portions 35*b* contact with the right flange 32, respectively. In this state, the distance between the both flanges 32 becomes shorter, and the lock sleeves 31 become close to each other. Accordingly, the frame body portion 15 can be firmly held between the tapered surfaces 31*a*, so that the guard shaft 30 and thus the guard plates 12 can be supported by the holding frame 11.

In the state when the guard plates 12 are firmly held, as the guard lever 35 moves from the lock position to an unlock position by pivoting the guard lever 35 about the shaft 36 in the counterclockwise direction as indicated by a two-headed arrow on the left side in FIG. 7, the cam portions 35*b* move not to face with the right flange 32, while and the side edges 35*c* move to face to the flange 32. In this unlock condition, since the distance between the lock sleeves 32 becomes larger, tightening of the frame body portion 15 can be released. Therefore, the guard shaft 30 can be moved upwardly in the radial direction and can be removed through a guard mounting opening 15*b* described below, so that the guard plates 12 can be detached from the frame body portion 15, and thus the guard plates 12 can be removed from the holding frame 11 together with the guard shaft 30. FIG. 8 shows the guard plates 12 detached from the holding frame 11.

The guard mounting opening 15*b* is formed on the frame body portion 15. Similar to the frame opening 8*a* of the riving knife 8, the guard opening 15*b* has a keyhole shape opening upward, and includes a narrowed portion 15*ba* and a circular fixing portion 15*bb* continuously formed with the bottom of the narrowed portion 15*ba*. The width of the narrowed portion 15*ba* is smaller than the diameter of the fixing portion 15*bb*. In addition, the width of the narrowed portions 15*ba* is larger than the diameter of the guard shaft 30, and the diameter of the fixing portions 15*bb* is smaller than the outer diameter of each lock sleeve 31. Accordingly, when the guard lever 35 has pivoted to the lock position as shown in FIG. 7, the tapered surfaces 31*a* of the lock sleeves 31 are pressed against edges of the corresponding fixing portions 15*bb* from opposite sides, and thus the frame body portion 15 can be firmly clamped between the lock sleeves 31.

When the guard lever 35 has pivoted to the unlock position, the pressing force applied by the tapered surfaces 31*a* against the edges of the fixing portions 15*bb* is released. In this state, the guard plates 12 can be detached from the holding frame 11 by lifting the guard shaft 30 upwardly in the radial direction and withdrawing the same from the guard openings 15*b* (including the narrowed portions 15*ba* and the fixing portions 15*bb*) as shown in FIG. 8.

Figure 3:
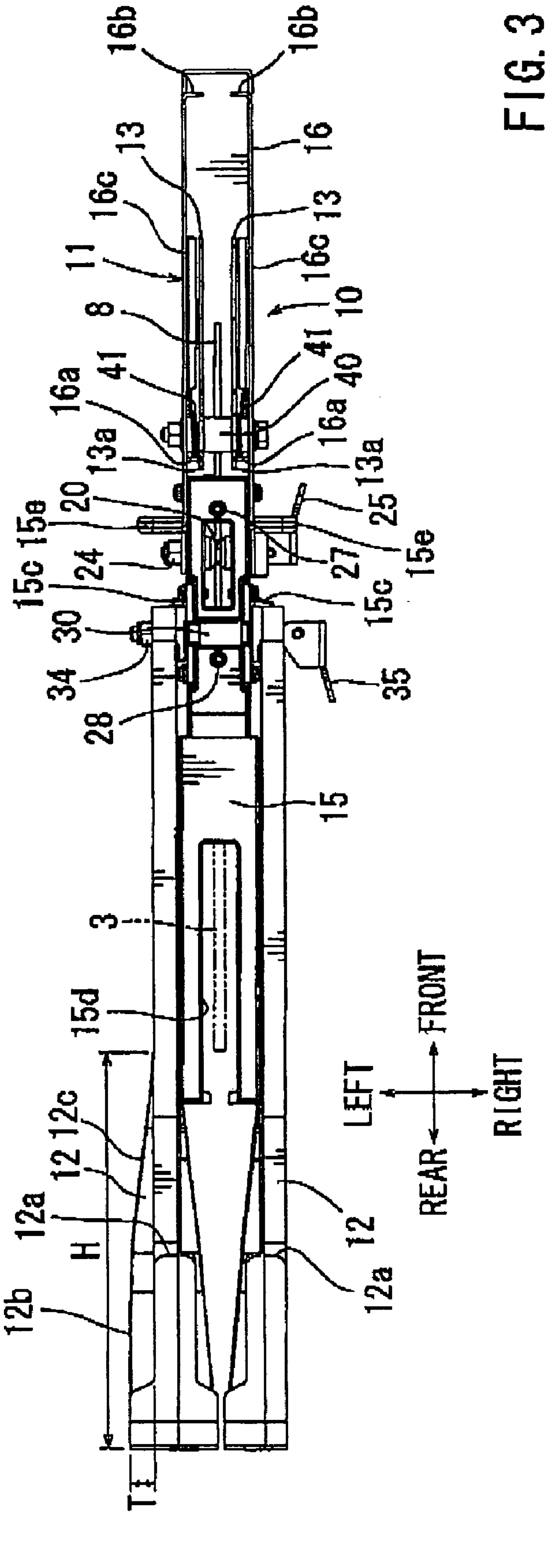
FIG. 3 is a plane view of the saw blade protector according to the present invention.
Figure 4:
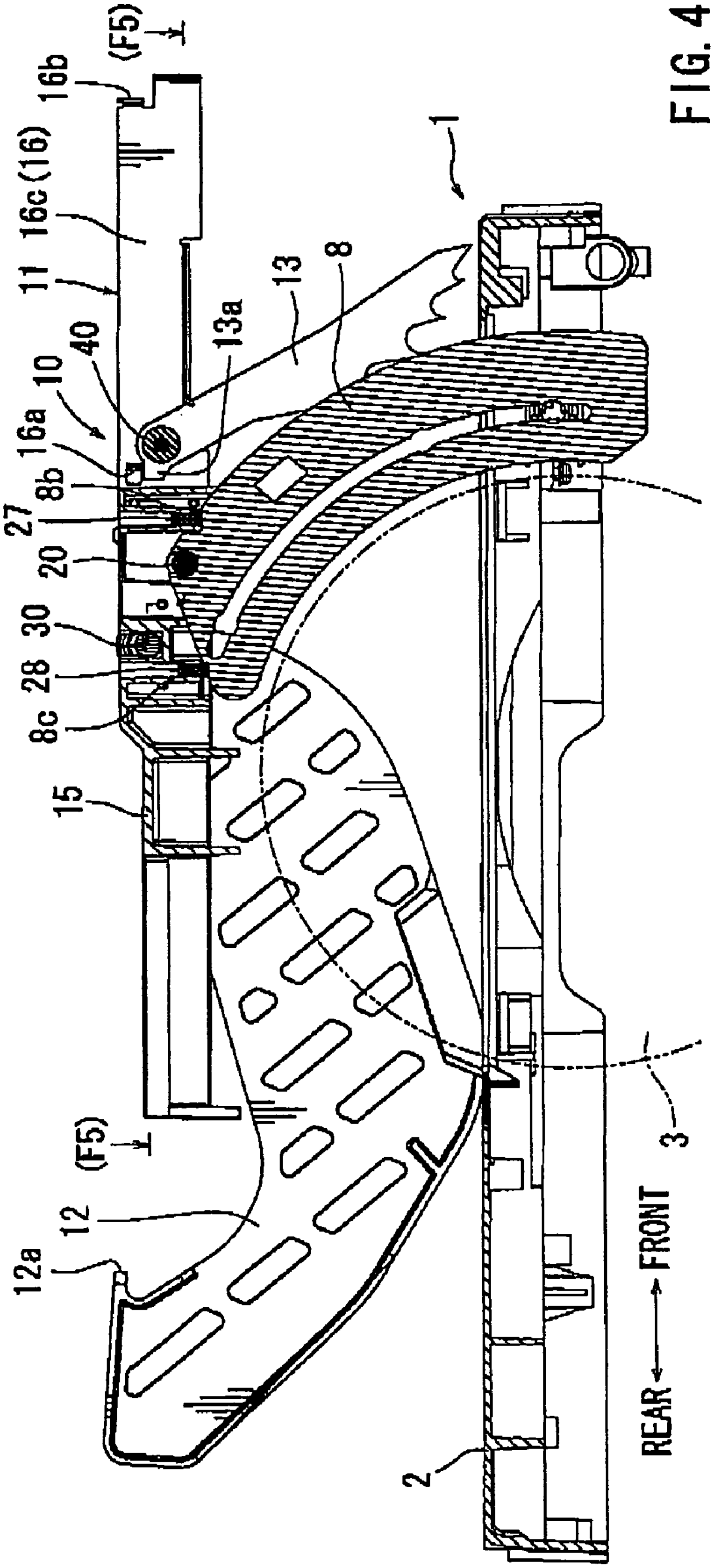
FIG. 4 is a vertical cross sectional view of the saw blade protector according to the present invention.
Figure 5:
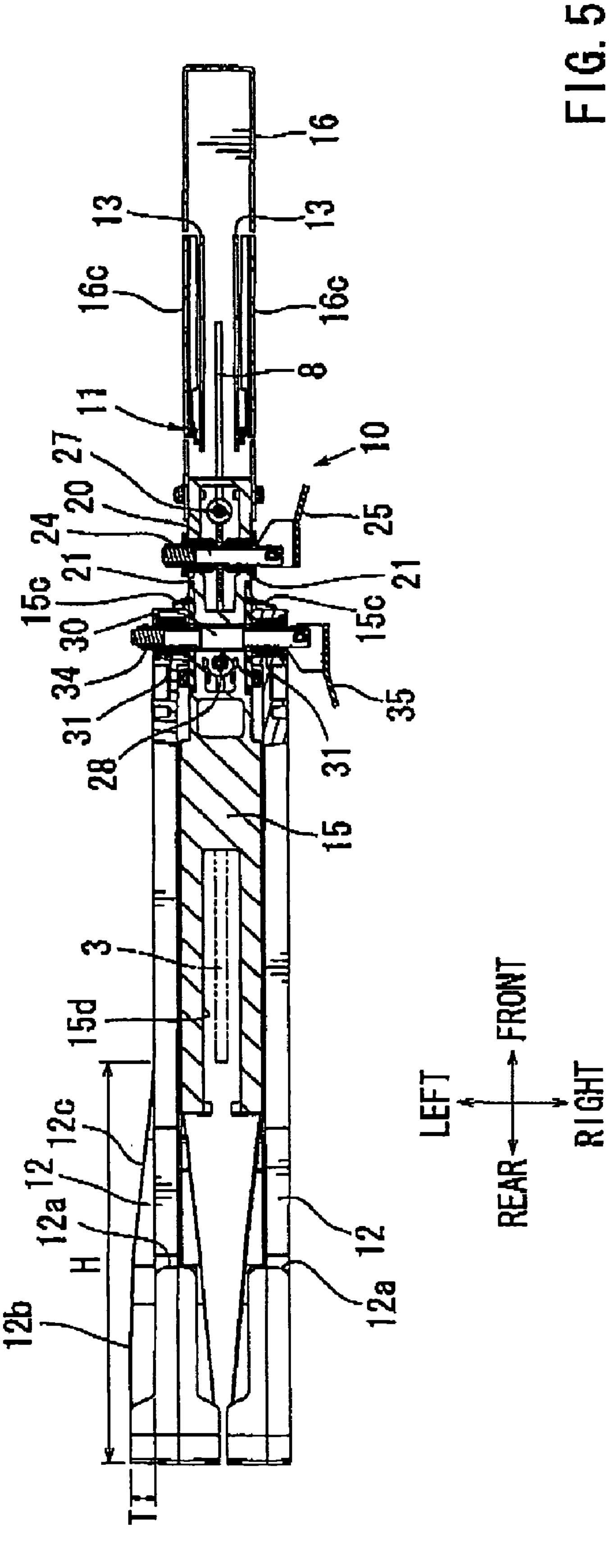
FIG. 5 is a horizontal cross sectional view of the saw blade protector taken along a line (F5)-(F5) in FIG. 4.

As shown in FIG. 3, a rear section (a front section as viewed from the side of the operator) of the frame body portion 15 has a bifurcated shape and includes a slot (or a window portion 15*d* used as a view window for positioning the workpiece W) having a constant width and extending in the longitudinal direction. The operator can look at a cut portion of the workpiece W through the window portion 15*d* from above, and therefore, the operator can position the workpiece W relative to the saw blade 3 and then can perform a cutting operation in a comfortable position.

The pair of kickback prevention claws 13 is supported by the auxiliary frame portion 16 or a front side part of the holding frame 11. The auxiliary frame portion 16 has a U-shaped configuration. A shaft 40 is supported such that the shaft 40 extends between the opposite wall portions 16*c* of the auxiliary frame portion 16. The kickback prevention claws 13 are vertically pivotally supported by the auxiliary frame portion 16 via the shaft 40. The kickback prevention claws 13 are biased downwardly by torsion springs 41. In addition, stopper portions 13*a* are formed on the kickback prevention claws 13, respectively. Stopper projections 16*a* are provided on the opposite walls 16*c* of the auxiliary frame portion 16 and protrude inwardly to correspond to the stopper portions 13*a*. When the stopper portions 13*a* contact with the stopper projections 16*a* from below, downward pivotal movements (in the clockwise direction in FIG. 4) of the kickback prevention claws 13 are restricted.

In a normal usage condition that the saw blade protector 10 is attached to the riving knife 8, the kickback prevention claws 13 contacts the upper surface of the table 2, the upper surface of the table 2 prevents the kickback prevention claws 13 from pivoting further downwardly. When the riving knife 8 protrudes from the upper surface of the table 2 by a large distance as shown in FIG. 2 (FIG. 2 shows a state that the riving knife 8 is positioned at the highest position), or when the saw blade protector 10 is removed from the riving knife 8, the stopper portions 13*a* may contact the stopper projections 16*a*, and thus, the downward pivotal movements of the kickback prevention claws 13 can be restricted.

The pivotal movements of the kickback prevention claws 13 are restricted to the area in front of a vertical line passing through the shaft 40 due to contact of the stopper projections 16*a* with the stopper portions 13*a*. In this embodiment, the pivotal movement of the kickback preventing claws 13 is restricted such that when the saw blade 3 is positioned to be perpendicular to the upper surface of the table 2 (a vertically cutting position), end portions of the kickback prevention claws 13 are spaced away from the upper surface of the table 2 (lower limit position) by a predetermined distance. By setting the lower limit position in this way, for example, during an oblique cutting operation where the saw blade 3 and the riving knife 8 are inclined laterally with respect to the moving direction of the workpiece W, it is able to prevent the end portions of the kickback prevention claws 13 from contacting with the upper surface of the table 2 without need of lifting the end portions by a hand of the operator.

Holding projections 16*b* that project inwardly are provided on a front end of the auxiliary frame portion 16 in order to hold the kickback prevention claws 13 at rest positions, where the kickback prevention claws 13 are pivoted upward. By pivoting the kickback prevention claws 13 upwardly against the torsion springs 41 and positioning the end portions of the kickback prevention claws 13 to rest on the holding projections 16*b* as shown in FIG. 8, the kickback prevention claws 13 cam be held between the wall portions 16*c* of the auxiliary frame portion 16. The kickback prevention claws 13 can be kept at the rest positions due to the biasing forces of the torsion springs 41.

Since the kickback prevention claws 13 can be held between the wall portions 16*c* as shown in FIG. 8, it is able to prevent the kickback prevention claws 13 from contacting with other substances when the kickback prevention claws 13 are not used, or when the saw blade protector 10 is detached.

Figure 11:
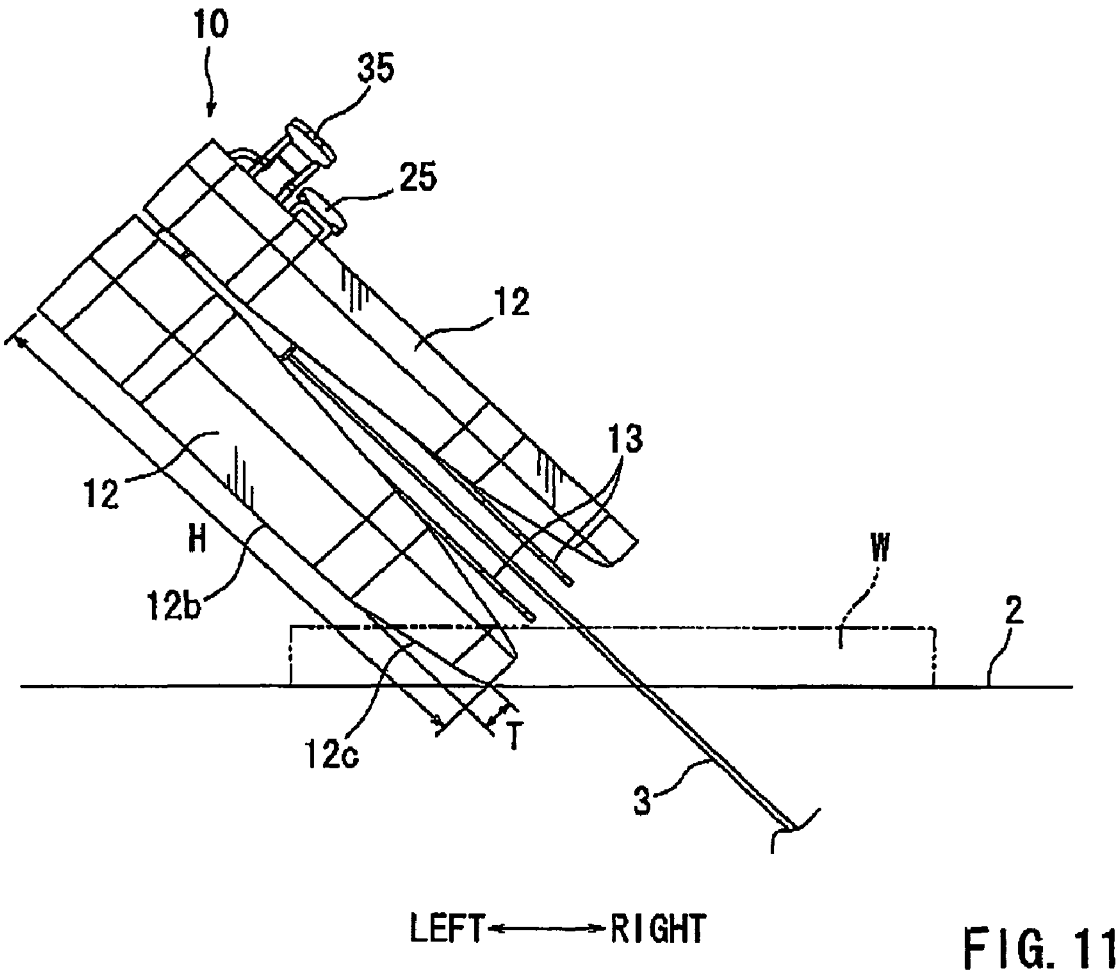
FIG. 11 is an elevation view of the saw blade protector according to the present invention viewed along an arrow (F11) in FIG. 10.

As shown in FIGS. 10 and 11, an auxiliary flange portion 12*b* is formed on one of the guard plates 12 positioned on the left side as viewed from the side of the operator. The auxiliary flange portion 12*b* is formed in a lower rear section of the guard plated 12 along approximately a quarter (90 degrees) of a circumferential length of the guard plate 12 as indicated by a range H in FIG. 10. A protruding width of auxiliary flange portion 12*b* becomes larger toward a rear end of the guard plate 12 (the end close to the operator), and the flange portion 12*b* has the greatest width T around the rear end. As clearly shown in FIG. 11, the width of the left guard plate 12 is broader than the width of the right guard plate 12 because of increase in width to the greatest width T. An inclined edge portion 12*c* extends along nearly the front half of the auxiliary flange portion 12*b* (within the range H), which gradually becomes broader toward the rear end. The inclined edge portion 12*c* serves to contact with the workpiece W during the oblique cutting operation.

In the case of the vertical cutting operation, where the saw blade 3 extends perpendicular to the upper surface of the table 2, no substantial problem may be caused since the workpiece W contacts with rear surfaces of the guard plates 12 evenly. On the other hand, in the case of the oblique cutting operation, where the saw blade 3 is inclined, (e.g., at 45 degrees in the left direction), the guard plates 12 are inclined leftward together with the saw blade 3. In this condition, mainly the inclined edge portion 12*c* of the auxiliary flange 12*b* of the left guard plate 12 located at a lower position than the right guard plate 12 may contact with the workpiece W that is moved forwardly by the operator.

In the case of such a leftward oblique cutting, the left edge portion (within the range H) of the left guard plate 12 is tilted relative to the upper surface of the table 2 both in the longitudinal direction (forward and rearward directions) and the transverse direction (right and left directions), and the left side and the front side of the left edge portion is positioned to be lower than the right side and the front side, respectively. Therefore, without any countermeasure, the workpiece W may be wedged between the upper surface of the table 2 and the left guard plate 12, and thus, the left guard plate 12 may not pivot smoothly upward.

However, according to this embodiment, the inclined edge portion 12*c* is formed on the left side portion of the left guard plate 12 as described above. Accordingly, this inclined edge portion 12*c* works as a relief portion, thereby preventing the workpiece W from wedging. Furthermore, the pressing force applied to the guard plate 12 by the movement of the workpiece W may be applied as a force for pressing the guard plate 12 upwardly due to the action of the inclined edge portion 12*c*, and thus, the guard plate 12 can be pivoted smoothly upward.

By providing an auxiliary flange portion, which is similar to the auxiliary flange portion 12*b*, on the right guard plate 12, the same effect can be obtained when a rightward oblique cutting is performed.

In accordance with the saw blade protector 10 described above, the holding frame 11 supporting the both right and left guard plates 12 is supported such that the holding frame 11 can be tilted in the longitudinal direction (forward and rearward directions) about the frame shaft 20. In addition, by adjusting the protruding distance of the position adjusting screws 27 and 28 positioned on the front side and the rear side of the frame shaft 20, respectively, fine adjustment of inclination in the longitudinal direction of the holding frame 11 and thus the height of the holding frame 11 from the upper surface of the table 2 is achieved. By finely adjusting the height of the holding frame 11, the heights of the right and left guard plates 12 relative to the saw blade 3 are adjustable in order to set the covering area adequately.

In addition, by adjusting the position adjusting screws 27 and 28 such that the position adjusting screws 27 and 28 bear against the bearing portions 8*b* and 8*c* of the riving knife 8 by large forces, respectively, the holding frame 11 can be firmly fixed with respect to the tilting direction.

Furthermore, according to the saw blade protector 10 of this embodiment, since the height (distance L in FIG. 2) of the rear end portion on the side of the operator of the holding frame 11 can be adjusted, it is able to certainly ensure a function required for this type of cutting device 1.

In accordance with the saw blade protector 10 of this embodiment, it is able to easily remove the guard plates 12 and the kickback prevention claws 13 at a time without need of tools, such as spanners, by pivoting the frame lever 25 toward the unlock position, and thus, maintenance works, such as exchange of the saw blade 3, can be carried out rapidly and efficiently. On the other hand, in an assembly operation, it is only necessary to pivot the frame lever 25 toward the lock position after inserting the frame shaft 20 into the frame opening 8*a* of the riving knife 8, and thus it is able to easily carry out the assembly operation without need of any specific tools.

By pivoting the guard lever 35 toward the unlock position, the right and left guard plates 12 can be easily removed from the holding frame 11 while the holding frame 11 is attached to the riving knife 8. Therefore, the cutting operation can be carried out in the state that only the holding frame 11 and the kickback prevention claws 13 are attached to the riving knife 8, and that the guard plates 12 are removed from the saw blade 3.

As shown in FIG. 8, the saw blade protector 10 can be detached from the riving knife 8, and the both guard plates 12 can be removed from the holding frame 11. Therefore, the components can be easily exchanged and repaired, so that the maintenance work can be further easily performed.

When the stopper portions 13*a* of the kickback prevention claws 13 contact with the corresponding stopper projections 16*a* of the auxiliary frame 16, the downward pivotal ranges of the kickback prevention claws 13 are restricted not to exceed the vertical line passing through the shaft 40, and thus it is able to easily adapt the kickback prevention claws 13 to the oblique cutting operation, where the saw blade 3 is inclined leftward or rightward with respect to the cutting direction. In addition, during the assembly operation of the saw blade protector 10 to the riving knife 8, the kickback prevention claws 13 can be positioned for certainly performing their functions without need of holding the kickback prevention claws 13 within given ranges, e.g., by hand.

The kickback prevention claws 13 can be held inside of the auxiliary frame 16 as shown in FIG. 8, and therefore, other things, such as a hand tool, can be prevented from interfering with the kickback prevention claws 13.

The guard stoppers 15*c* can restrict the downward pivotal ranges of the right and left guard plates 12, and thus unintended movements of the guard plates 12 can be prevented when in the state that the saw blade protector 10 is removed from the riving knife 8. Therefore, efficiency of the assembly operation and the handling property in the detached state can be improved.

The embodiment described above can be variously modified. For example, although it is exemplified that the saw blade protector 10 is attached to the riving knife 8 by clamping the riving knife 8 between the pair of the lock sleeves 21 supported by the frame shaft 20 due to action of the cam portion 25*b* of the frame lever 25, the saw blade protector 10 can be attached to the riving knife 8 by inserting the frame shaft 20 into the wall portions 15*a* and the riving knife 8. Also, in such a configuration, the holding frame 11 and thus the saw blade protector 10 can be firmly fixed to the riving knife 8 and the height and the inclination angle of the holding frame 11 can be adjusted by adjusting the protruding distance of the position adjusting screws 27 and 28 positioned on the front side and the rear side of the frame shaft 20.

With respect to the support structure of the guard plates 12 against the holding frame 11, although a single step attaching/detaching mechanism by the operation of the lever (which is similar to the attaching/detaching mechanism of the holding frame 11 to the riving knife 8 is exemplified), the guard plates 12 may be configured such that the guard plates 12 cannot be removed from the holding frame 11. On the other hand, the single step attaching/detaching mechanism by the operation of the lever can be also applied to the kickback prevention claws 13.

The present invention can also be applied to a saw blade protector that does not have kickback prevention claws 13. In such a case, the auxiliary frame 16 can be omitted.

The invention claimed is:

1. A saw blade protector for a cutting device having a table for placing thereon a workpiece, a saw blade protruding from an upper surface of the table, and a riving knife disposed in front of the saw blade in a moving direction of the workpiece for cutting the workpiece and positioned in line with the saw blade, the riving knife having a first flat surface and a second flat surface on a circumference thereof, the saw blade protector comprising:

a guard plate constructed to cover the saw blade;

a holding frame constructed to be mounted on an upper portion of the riving knife and to be able to support the guard plate, and an adjusting device having a first adjusting member and a second adjusting member that contact with the first flat surface and the second flat surface of the riving knife, respectively, the first adjusting member and the second adjusting member being movably and directly mounted on the holding frame in order to adjust a position of the holding frame relative to the upper surface of the table.

2. The saw blade protector according to claim 1, wherein:

the holding frame can pivot relative to the upper portion of the riving knife about a pivotal axis substantially parallel to the upper surface of the table, and the adjusting device can adjust the position of the holding frame about the pivotal axis.

3. The saw blade protector according to claim 1, wherein:

the first adjusting member and the second adjusting member can change a position relative to the holding frame independently of each other.

4. The saw blade protector according to claim 1, wherein at least one of the first adjusting member and the second adjusting member is formed in a screw shape.

5. The saw blade protector according to claim 4, wherein the first adjusting member and the second adjusting member are disposed parallel to each other.

* * * * *